(12) United States Patent
Manzke et al.

(10) Patent No.: US 8,435,369 B2
(45) Date of Patent: May 7, 2013

(54) PLASTICS WELDING TOOL AND METHOD USING RELIEF AREAS FOR REDUCED READ-THROUGH

(75) Inventors: Friedhelm Manzke, White Lake, MI (US); Douglas E. Redmond, Chesterfield, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 120 days.

(21) Appl. No.: 12/862,924

(22) Filed: Aug. 25, 2010

(65) Prior Publication Data

US 2012/0048449 A1   Mar. 1, 2012

(51) Int. Cl.
*B29C 65/06* (2006.01)

(52) U.S. Cl.
USPC ............................ 156/73.5; 156/308.2

(58) Field of Classification Search ........... 156/73.5, 156/308.2, 308.4, 309.6; 264/68; 228/112.1
See application file for complete search history.

(56) References Cited

U.S. PATENT DOCUMENTS

| | | | | |
|---|---|---|---|---|
| 4,776,905 A | * | 10/1988 | Cheung et al. | 156/73.5 |
| 5,238,521 A | * | 8/1993 | Cheung et al. | 156/502 |
| 5,354,392 A | * | 10/1994 | Santo et al. | 156/73.1 |

* cited by examiner

*Primary Examiner* — James Sells
(74) *Attorney, Agent, or Firm* — Reising Ethington P.C.

(57) ABSTRACT

A welding tool, such as a vibration welding tool, includes one or more relief areas for material to flow into during a welding process to help prevent deformation of a substrate that a component is being attached to.

11 Claims, 2 Drawing Sheets

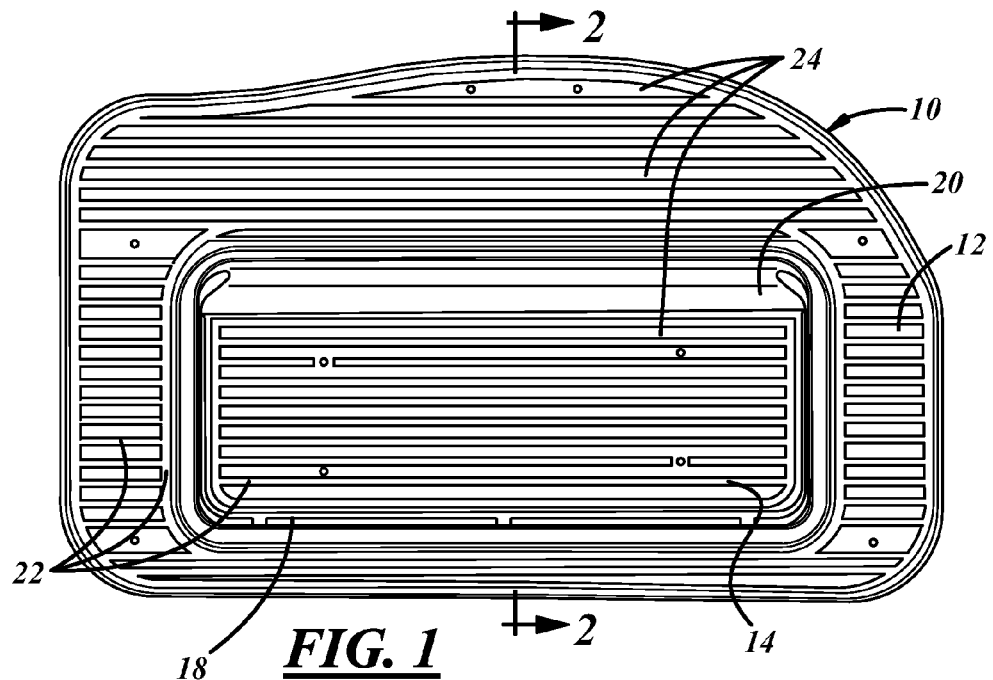
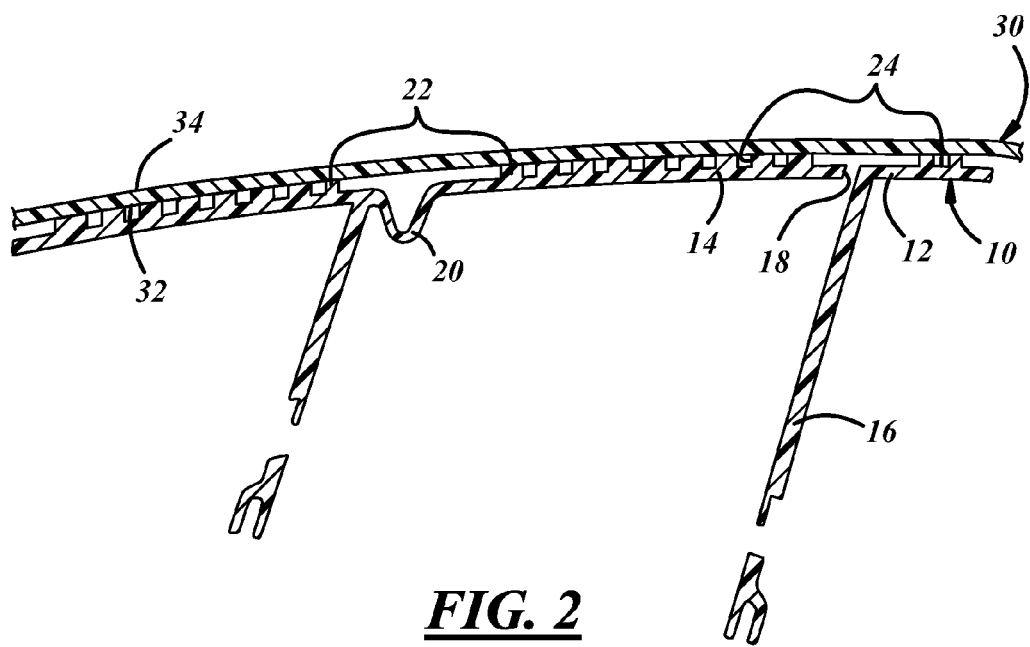

US 8,435,369 B2

PLASTICS WELDING TOOL AND METHOD USING RELIEF AREAS FOR REDUCED READ-THROUGH

TECHNICAL FIELD

The present disclosure relates generally to vibration welding and other joining processes and related equipment.

BACKGROUND OF THE INVENTION

Vibration welding is a manufacturing process than can be used to join two or more parts together, usually without the use of additional materials such as adhesives or fasteners. It can be used with plastic, metal, or other materials and generally involves applying mechanical vibrations to one or more of the parts to generate heat at the interface of the parts. The vibrations can be applied at frequencies and amplitudes sufficient to cause softening and/or melting of material at the interface. When the vibrations are halted, any softened or molten material can then cool and resolidify, forming a bond at the interface of the parts. Molten material formed during vibration welding and other types of welding operations can sometimes have unpredictable or undesirable flow characteristics.

SUMMARY OF THE INVENTION

According to one embodiment of the invention, there is provided a vibration welding tool for attaching together a component and a substrate that, when brought together for attachment, have component channels located therebetween. The vibration welding tool includes a tool face having one or more tool channels formed therein, and the tool channel(s) are arranged to correspond to one or more of the component channels when the tool face contacts the component to perform a welding operation.

In accordance with another embodiment of the invention, there is provided a method of attaching a component and a substrate together. The method includes providing a substrate having a weld side and a component having a tool side and an opposite weld side. At least one of the weld sides includes one or more component channels formed therein. The method further includes providing a vibration welding tool having a tool face with one or more relief areas formed therein that correspond with the one or more component channels. The component is disposed adjacent the substrate such that the weld sides are brought into engagement with each other. The tool face is brought into contact with the tool side of the component and the substrate and the component are vibration welding together so that molten material flows into one or more component channels and so that the tool side of the component changes shape to at least partially conform to the shape of one or more of the relief areas of the tool face.

In accordance with another embodiment of the invention, there is provided a method of attaching a component and a substrate together. The method includes providing a substrate having a weld side and a component having a tool side and an opposite weld side, with at least one of the weld sides having one or more ribs extending therefrom. The method further includes providing a welding tool having a tool face with one or more relief areas formed therein. The component is disposed adjacent the substrate such that the weld sides oppose one another and the ribs at least partially define one or more component channels. The component and/or the substrate are heated at an interface of the component and the substrate to a level sufficient to form molten material, at least some of which can flow into the component channels. A load is applied to the component in the direction of the substrate using the welding tool, such that one or more of the relief areas is generally aligned with one or more of the component channels. The method also includes the step of continuing to apply the load after one or more component channels is substantially filled with material from the molten material, such that a corresponding portion of the tool side of the component flows into one or more of the relief areas, thereby helping to prevent changes in the appearance of the substrate.

BRIEF DESCRIPTION OF THE DRAWINGS

One or more preferred exemplary embodiments of the invention will hereinafter be described in conjunction with the appended drawings, wherein like designations denote like elements, and wherein:

FIG. 1 is a plan view of the weld side of an air bag component that includes a plurality of ribs and channels;

FIG. 2 is a cross-sectional view of the air bag component of FIG. 1 disposed adjacent a substrate;

DETAILED DESCRIPTION OF THE PREFERRED EMBODIMENT(S)

Figure 3:
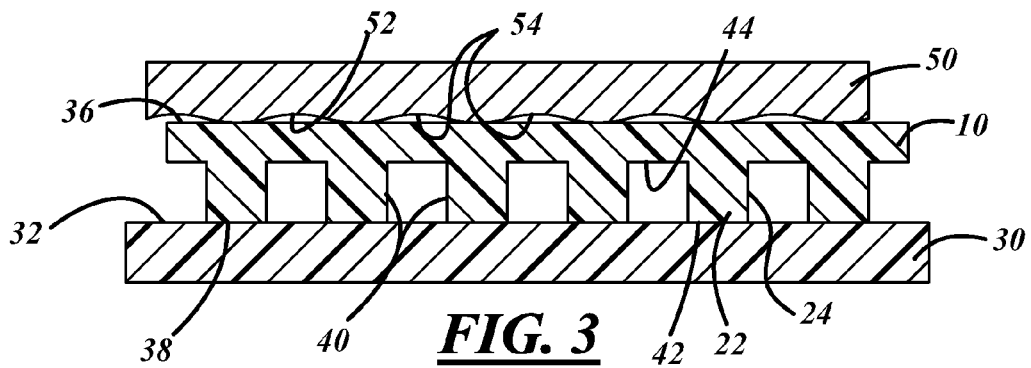
FIG. 3 is an enlarged cross-sectional view of a portion of the air bag component and substrate of FIG. 2 shown inverted with a tool face contacting the air bag component to perform a welding operation.

As will be further described herein, controlling the flow of molten material during welding processes, particularly when joining plastic materials together, can be useful to promote strong joints between the parts being joined while simultaneously optimizing the aesthetic qualities of the joined parts. For example, it is possible that molten material formed during a plastics joining process can flow out of the joint in the form of weld flash and become visible on or around the finished assembly. In decorative applications, this would be an undesirable result. It is also possible that molten material formed during a joining process can come into contact with other portions or surfaces of the parts being joined, these other portions or surfaces not necessarily being an intended part of the joint. This can lead to inadvertent localized heating of areas of the joined parts that are away from the joint. This type of inadvertent heating can cause unwanted changes in the shape or properties of the affected material. For example, in applications in which molten material is formed during a joining process on the non-visible side of a decorative part, the molten material may build-up on the non-visible side. This molten material build-up may show through to the visible side of the decorative part by heating the decorative part sufficiently to cause witness marks or read-through areas on the visible side. These witness marks or read-through areas can be caused by the locally heated portions of the decorative part shrinking upon cooling, by the gloss level of the decorative part changing due to the heating, or by other effects of the heat introduced to the parts during the joining process.

One application for plastics joining processes is the assembly of automotive components. Where such components are intended for use in the passenger cabin of automobiles, aesthetic appearance can be an important consideration. Some examples of interior automotive applications for plastics joining processes include the joining of door panel, glove box, coin tray, console, or other plastic trim components. Other examples include attaching components to the non-visible side of an automotive instrument panel, such as air duct components, air bag components, or other components. In all of these applications where portions of the assembled components are visible to passengers, it is desirable to minimize aesthetic defects caused by the joining processes.

While the plastics joining processes and related equipment disclosed below are described for use with particular plastic components for automobile interiors, namely air bag components and instrument panels, it should be recognized that these processes and equipment may be used with any plastic components and that air bag components and instrument panels are used here merely as exemplary applications. Likewise, vibration welding is only one of several plastics joining processes that may benefit from the processes and equipment described below. Any plastics joining process in which molten material is formed or in which the plastic components are softened or melted during the joining process can benefit from the techniques and equipment described herein.

Referring now to FIGS. 1 and 2, an exemplary air bag component 10 is shown. The air bag component 10 includes a frame 12, a door 14, and a chute 16. In this example, the air bag component is a one-piece component such that the frame 12, door 14, and chute 16 are formed integrally in a molding process such as injection molding. Generally, the frame 12 and door 14 lie in the same plane or along the same curve, and the frame 12 surrounds the door 14, forming an opening or gap 18 on three sides of the door 14. The fourth side of the door 14 includes a hinge 20 that is integrally formed with and attached to the frame 12. Chute 16, as shown in FIG. 2, extends from the underside of frame 12 and generally circumscribes the door 14. The chute 16 typically houses an inflatable air bag (not shown) and can also house an air bag inflator (not shown). When an air bag disposed within the chute 16 inflates, the chute 16 guides the air bag toward the door 14 for air bag deployment. The exemplary air bag component 10 also includes a plurality of ribs 22 extending therefrom. The ribs 22, in this example, extend from surfaces of the frame 12 and the door 14 and can be used to facilitate joining processes as will be described in more detail below. The ribs 22 also at least partially define component channels 24, with each component channel generally lying between adjacent ribs 22.

As shown in FIG. 2, the exemplary air bag component 10 may be attached to an instrument panel substrate 30. The instrument panel substrate 30 includes opposite inner and outer surfaces 32 and 34. As shown, the air bag component 10 may be disposed adjacent to inner surface 32 for attachment by various joining techniques. Outer surface 34 may be a visible surface in some applications, meaning that it is visible to a passenger in the interior of an automobile in which it is installed. The substrate 30 may be molded from plastic resin in the desired color for the visible surface, or the visible surface may be finished with paint or other types of finishes. In some applications, the outer surface 34 of the substrate 30 is not visible and is covered with additional layers of materials including, for example, foam materials and/or additional polymeric layers such as decorative skins. The inner surface 32 of the instrument panel substrate 30 is typically scored or otherwise weakened in an area corresponding to the opening or gap 18 of the air bag component so that when an air bag is inflated and chute 16 guides the air bag toward door 14, the instrument panel substrate 30 can be selectively breached to form an opening in the substrate through which the air bag can deploy. In some air bag applications, it is necessary that the air bag component door 14 is securely attached to its corresponding portion of the instrument panel substrate 30 so that the portion of the substrate overlying the door 14 remains attached to the door 14 during air bag deployment and is not permitted to be freely projected into the passenger cabin of the vehicle. Likewise, secure attachment of frame 12 to the substrate 30 may be necessary so that the air bag component 10, along with the air bag and inflator it may contain, is properly supported beneath the instrument panel substrate 30 and can withstand the forces generated when the air bag is deployed and breaks through the substrate 30.

Air bag component 10 and instrument panel substrate 30 can each be constructed from a variety of materials. They are typically constructed from plastic materials, preferably thermoplastic materials. The component 10 and the substrate 30 can be made from the same type of material or different types of materials. Some examples of the types of materials that each may be made from include olefin-based plastics such as polypropylene, polyethylene, TPOs, and blends or alloys thereof; thermoplastic elastomers (TPEs); ABS, polycarbonate (PC), PC/ABS alloys, and other styrenic materials such as SMA; polyamides; polyacetals; and polyesters such as PET and PBT. Each material can of course be modified with fillers, reinforcements, and/or impact-modifiers, etc. to tailor its properties. In the joining processes described herein, it may be useful to select materials for component 10 and substrate 30 that are compatible with one another in some way. For example, each of component 10 and substrate 30 may be constructed from the same material, such as polypropylene, for example. Or each of component 10 and substrate 30 may be constructed from materials that have similar melting points, softening points, glass transition temperatures, or other thermal properties. Or each may be constructed from materials generally in the same material family; e.g., the component 10 may be made from TPO and the substrate 30 may be made from polypropylene, both olefin-based materials. Another indicator of compatibility may be crystallinity. For example, amorphous materials such as polycarbonate and ABS may be more compatible with one another than an amorphous material (like ABS) and a semi-crystalline material (like polyamide). In one embodiment, air bag component 10 comprises a thermoplastic elastomer (TPE) and instrument panel substrate 30 comprises polypropylene or other TPO, and the TPE includes olefin-based elastomer.

Because the joining processes and equipment described below are broadly applicable to more than just exemplary air bag component 10 and instrument panel substrate 30, these terms have been shortened to component 10 and substrate 30 in the following description.

One type of joining process that may be used to attach component 10 and substrate 30 together is vibration welding. An exemplary vibration welding set-up and process is shown schematically in cross-section in FIGS. 3-6 in progressive stages. Referring to FIG. 3, portions of component 10 and substrate 30 are shown disposed adjacent to one another in preparation for being attached together using welding tool 50. Component 10 includes a tool side 36 and a weld side 38. For example, in the exemplary air bag component 10 described above, weld side 38 corresponds to the side of the component shown in the plan view of FIG. 1, while the tool side 36 corresponds to the opposite side of the frame 12 and door 14 of the air bag component. Inner surface 32 of substrate 30 can also be referred to as a weld side of the substrate 30.

In this embodiment, ribs 22 are included on the weld side 38 of component 10, each rib 22 having two sidewalls 40 that oppose one another through the thickness of the rib and with each rib having a land 42. Adjacent ribs also partially define component channels 24. In this embodiment, each component channel 24 includes two rib sidewalls 40 and a bottom 44. However, the cross-sectional shape of the component channels 24 can come in various forms and does not have to be a squared-off U-shape as shown, nor do the component channels 24 necessarily have to be partially defined by portions of ribs. For example, a component channel could have a continuously curved cross-section, a V-shaped cross-section, or some other shape including shapes that do not have defined sidewalls or bottoms. Alternatively or in addition, one or more of the component channels 24 could be partially defined by ribs or other projections that are included on the weld side 32 of the substrate 30 rather than or in addition to ribs included on the weld side 38 of component 10.

Generally, a component channel has a length that is at least as long as its width. For example, in FIG. 1, channels 24 have lengths generally shown in a left-right direction and widths in the top-bottom direction of the figure with the cross-sections of FIGS. 2-6 taken across the widths of the component channels 24. Some component channels 24 have uniform cross-sections along their length, while others have cross-sections that vary along their length (see the component channel 24 at the top of FIG. 1, for example). While the component channels 24 shown in the figures are generally linear along their length, this is not necessary. For example, ribs and component channels could be wave-shaped or otherwise shaped when viewed from the weld side of the component.

Referring again to FIG. 3, welding tool 50 is shown in contact with the tool side 36 of component 10. More specifically, welding tool 50 includes a tool face 52 that comes into contact with the tool side 36 of component 10. Tool face 52 includes relief areas 54 formed therein. In the embodiment depicted in FIGS. 3-6, the relief areas 54 are in the form of tool channels. In embodiments such as this where the relief areas are tool channels, the tool channels 54 can be defined in a similar manner as component channels 24. This is to say that tool channels 54 are not limited to the continuously curved cross-sections shown in the figures. Like component channels 24, tool channels 54 can take various forms such as squared-off U-shapes, V-shapes, or other shapes and/or could be partially defined by ribs included on tool face 52. In the illustrated embodiment, tool channels 54 have a continuously curved cross-section and adjacent tool channels are connected to one another in a continuously curved cross-section to form a cross-section having alternating concave and convex portions. As with component channels 24, a tool channel generally has a length that is at least as long as its width, where the cross-sections in FIGS. 3-6 are taken across the width of the tool channels 54.

The relief areas formed in tool face 52 may be arranged in locations that are meant to correspond to the component channels 24 of the component and/or substrate that the welding tool is to be used to join. In the embodiment shown in the figures, for example, tool channels 54 are generally arranged in tool face 52 so that when the tool face contacts the component 10, each of the tool channels 54 is generally aligned with a component channel 24. This is not always necessarily the case, however. Tool channels 54 can correspond to component channels 24 in other ways, such as having similar spacing between respective channels. For example, in some embodiments, the tool channels 54 may be spaced the same as component channels 24, but be aligned with ribs 22 rather than component channels 24. By way of another example, the channel spacing may also be similar for the component and the tool, but each tool channel may be aligned with a rib sidewall. Or each tool channel 54 may be aligned with a different feature of the component 10 and or substrate 30, with one or more tool channels 54 being aligned with a component channel 24 and one or more tool channels 54 being aligned with a rib 22 or a sidewall 40, for example. In some embodiments a single tool channel may be arranged to correspond to more than one component channel, for example having a width that spans more than one component channel. The particular type of correspondence of relief areas 54 with component channels 24 will depend upon the particular application and process parameters, some of which will be described below.

An exemplary vibration welding process can be described with reference to FIGS. 3-6. Substrate 30 can be supported in a nest or other tooling (not shown) with its weld side 32 oriented in a generally upward direction. Component 10 can be disposed adjacent the substrate 30 such that the weld side 38 of component 10 is brought into engagement with the weld side 32 of the substrate 30 so that component channels 24 are located between the component 10 and the substrate 30. As described previously, the welding tool 50 is provided with a tool face 52 that includes one or more relief areas 54 formed therein, the one or more relief areas 54 corresponding with one or more of the component channels 24. The tool face 52 can then be brought into contact with component 10. A load can then be applied to the component 10 by the welding tool 50 in the direction indicated by the arrow in FIGS. 4-6. The magnitude of the load may vary depending on the component and substrate being joined, but is generally sufficient for the tool face 52 to frictionally "grip" the component 10, approximately 150 pounds in one embodiment.

Mechanical vibrations are then applied to the welding tool 50 by external equipment not shown in the figures. It is also possible for the vibrations to be applied to the welding tool 50 prior to the tool contacting the component. In this example of a vibration welding process, the vibrations, or oscillations, are applied in a back-and-forth motion so that the component 10 and substrate 30 are rubbed together at an interface where they are engaged with one another. The back-and-forth motion in this embodiment is in a direction generally in alignment with the lengthwise direction of the component channels 24; i.e., in a direction into and out of the page when viewing FIGS. 3-6. However, in some embodiments the vibrations are applied in other back-and-forth directions or in an orbital motion such as circular or elliptical motions. The frequency of the applied vibrations may be generally constant and can range from about 100 to about 300 Hertz, preferably either 100 Hz or 240 Hz nominally. The amplitude of the applied vibrations may also be generally constant and can range from about 0.5 mm up to about 5 mm, preferably either 0.9 mm or 2 mm nominally. These are only exemplary ranges, and the actual process parameters depend on the materials, sizes, and/or geometries of the component 10 and substrate 30 and on the capabilities of the equipment, among other things.

Figure 4:
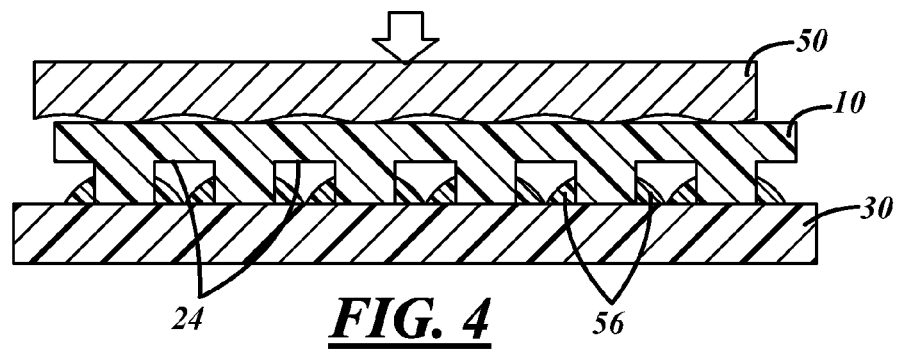
FIG. 4 is the cross-sectional view of the air bag component and substrate portions of FIG. 3 showing molten material being formed at their interface during the welding operation.
Figure 5:
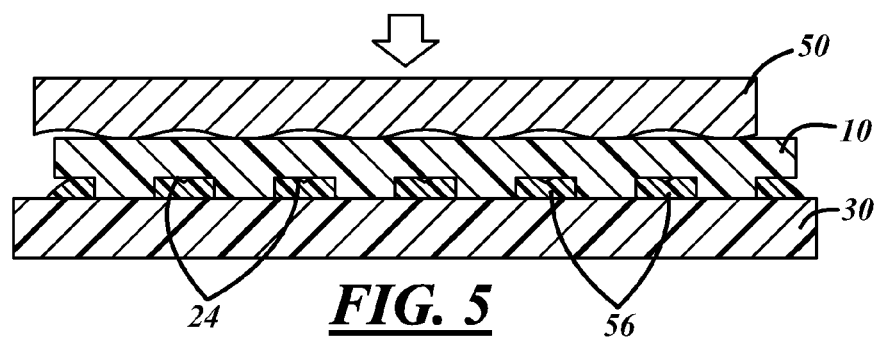
FIG. 5 is the cross-sectional view of the air bag component and substrate portions of FIG. 4 showing molten material filling the component channels as the welding operation progresses.
Figure 6:
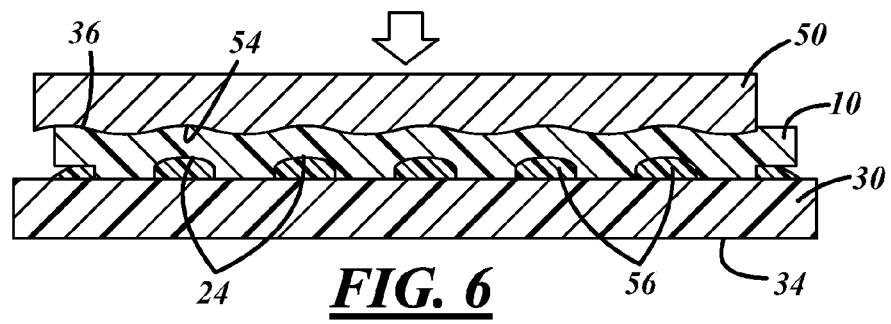
FIG. 6 is the cross-sectional view of the air bag component and substrate portions of FIG. 5 showing the component conforming in shape with relief areas in the tool face as the welding operation progresses.

The rubbing at the interface of the component 10 and the substrate 30 results in the generation of frictional heat at the interface. As shown in FIG. 4, when sufficient heat is generated, molten material 56 can be formed at the interface. The molten material 56 is comprised of one of, or preferably of both of, the materials from which the component 10 and substrate 30 are constructed. In the figures, only excess molten material 56 is depicted, but molten material may also be formed at the interface of the component 10 and the substrate and some molten material may be formed beneath the respective surfaces of the component 10 and the substrate 30 adjacent to the interface. Some of the molten material 56 flows into the component channels as the welding process progresses. As the welding process continues, more molten material 56 is formed, while the component channels 24 simultaneously decrease in size, resulting in less available space for the molten material 56 to flow into. FIG. 5, for example, shows the component channels 24 almost entirely filled with molten material 56. Eventually, it is possible that one or more of the component channels 24 becomes substantially filled with molten material. When this happens, the tool side 36 of component 10 can change shape to conform to the shape of one or more of the relief areas 54 in the tool face as the welding operation continues, as shown in FIG. 6. This change in shape of component 10 may be facilitated by softening of the component material due to the heat stored in the molten material 56. It may also be facilitated by selective material choices. For example, materials for the component 10 and the substrate 30 may be chosen such that the component material has a lower modulus of elasticity than the substrate material, particularly at elevated temperatures, so that when excess material is sandwiched between the component and the substrate, the component will change shape more readily than the substrate.

By allowing or causing material from the component 10 to conform to or flow into the relief areas 54 in the tool face, deformation of substrate 30 may be prevented. For example, if relief areas 54 were not provided in the tool face and instead the tool face was flat or planar, when component channels 24 are sufficiently reduced in size during the welding operation such that no more molten material can flow into the component channels, the result could be that the molten material is forced against the weld side of the substrate, possibly deforming the substrate and/or resulting in witness marks and/or read-through areas on outer surface 34 of substrate 30 such as previously described. In applications in which outer surface 34 is a visible surface of an aesthetic part, such as in automotive interior applications, such deformation or other change of appearance of the outer surface 34 is detrimental. Accordingly, the depth or size of the tool channels 54 may be selected such that the tool channels provide sufficient cross-sectional area and/or volume to accommodate the amount of molten material generated during a welding cycle that is in excess of the cross-sectional area and/or volume of the corresponding component channels 24, in particular after the component channels have been reduced in size by the welding operation. This tool channel depth may be as little as 0.5 mm or less, depending on the particular application.

In the exemplary embodiment depicted in FIGS. 3-6, tool channels 54 and component channels 24 are generally aligned with one another, as already described above. However, as also previously described, this alignment is not always necessary to achieve the result of preventing changes of appearance to the substrate. In some embodiments, the relief areas 54 are not tool channels, for example. It is possible through process development to identify particular areas of the substrate 30 that are more susceptible to aesthetic changes during a welding process than others and to provide relief areas in the tool face that correspond to the particular problem areas, whatever the shape. The relief areas in the tool face can also be advantageous even when the component channels do not become completely filled with molten material during the welding process. For example, it is possible that, as molten material is formed during the welding process, the material will ride up along the sidewalls of the component channels until reaching the bottom of the channels, partially solidifying along the way, so that as more molten material is formed, the excess material is pressing against both the component channel bottom and the weld side of the substrate without entirely filling the component channel. The relief areas in the tool face can allow the corresponding portion of the component 10 to deform rather than the substrate in such a case.

The use of a tool face having relief areas formed therein is not limited to vibration welding processes such as the vibration welding process described above. Another type of vibration welding is ultrasonic welding. In an ultrasonic welding process, molten material at the interface of a component and a substrate may be generated in generally the same manner as with vibration welding except that the vibrational frequencies are higher (generally above the range of human hearing), the amplitudes are lower, and the direction of oscillation can be in the direction of the applied load. But molten material formed at the interface may be managed in the same way using the techniques and equipment described herein.

Additionally, such welding tools may also be useful in other plastics joining processes that do not rely on vibrations and/or frictional heat to generate molten material, such as hot plate welding, hot air welding, or other types of welding such as solvent welding where plastic materials are softened or melted by heat or other means in order to bond one plastic part to another. For example, in hot plate welding, a heated plate may be placed between the component and the substrate in contact with their respective weld sides to heat the weld sides to a level sufficient to soften or melt the materials. Then the hot plate can be removed and the component and substrate can be pressed together. As with vibration welding, molten material will flow into the component channels, and relief areas in the tool face used to press the component and the substrate together can help to prevent aesthetic defects in the substrate in a similar manner as that described in a vibration welding process.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of attaching a component and a substrate together, comprising the steps of:
   providing a substrate having a weld side and a component having a tool side and an opposite weld side, at least one of the weld sides having one or more component channels formed therein;

providing a vibration welding tool having a tool face with one or more relief areas formed therein that correspond with the one or more component channels;

disposing the component adjacent the substrate such that the weld sides are brought into engagement with each other;

bringing the tool face into contact with the tool side of the component; and vibration welding the substrate and the component together so that molten material flows into one or more component channels and so that the tool side of the component changes shape to at least partially conform to the shape of one or more of the relief areas of the tool face.

2. The method of claim 1, wherein one or more of the relief areas is generally aligned with one or more of the component channels.

3. The method of claim 1, wherein the relief areas comprise tool channels.

4. The method of claim 1, wherein the substrate is a vehicle instrument panel having a visible surface and the weld side is opposite the visible surface.

5. The method of claim 1, wherein the component is an airbag component.

6. The method of claim 1, wherein the component is constructed from a material having a lower modulus of elasticity than the substrate material.

7. The method of claim 1, wherein the component is constructed from a material comprising a thermoplastic elastomer and the substrate is constructed from a material comprising a thermoplastic olefin.

8. A method of attaching a component and a substrate together, comprising the steps of:

providing a substrate having a weld side and a component having a tool side and an opposite weld side, at least one of the weld sides having one or more ribs extending therefrom;

providing a welding tool having a tool face with one or more relief areas formed therein;

disposing the component adjacent the substrate such that the weld sides oppose one another and the ribs at least partially define one or more component channels;

heating at least one of the component and the substrate at an interface of the component and the substrate to a level sufficient to form molten material, at least some of which can flow into the component channels;

applying a load to the component in the direction of the substrate using the welding tool, such that one or more of the relief areas is generally aligned with one or more of the component channels;

continuing to apply the load after one or more component channels is substantially filled with material from the molten material, such that a corresponding portion of the tool side of the component flows into one or more of the relief areas, thereby helping to prevent changes in the appearance of the substrate.

9. The method of claim 8, wherein the step of heating occurs after the step of applying the load, and the step of heating comprises oscillating the welding tool to form the molten material.

10. The method of claim 8, wherein the substrate comprises a vehicle instrument panel and the component comprises an airbag component.

11. The method of claim 8, wherein the component is constructed from a material having a lower modulus of elasticity than the substrate material.

* * * * *